US008849108B2

(12) United States Patent
Pradzynski et al.

(10) Patent No.: US 8,849,108 B2
(45) Date of Patent: Sep. 30, 2014

(54) SELF-CORRECTING WAVELENGTH COLLISION AVOIDANCE SYSTEM

(75) Inventors: Krzysztof Pradzynski, Santa Clara, CA (US); Sudhesh Mysore, Carlsbad, CA (US); Oleh Sniezko, Highlands Ranch, CO (US)

(73) Assignee: Aurora Networks Inc, Santa Clara, CA (US)

( * ) Notice: Subject to any disclaimer, the term of this patent is extended or adjusted under 35 U.S.C. 154(b) by 259 days.

(21) Appl. No.: 12/660,027

(22) Filed: Feb. 18, 2010

(65) Prior Publication Data

US 2010/0220994 A1    Sep. 2, 2010

Related U.S. Application Data

(60) Provisional application No. 61/208,027, filed on Feb. 18, 2009.

(51) Int. Cl.
| | |
|---|---|
| *G02F 1/00* | (2006.01) |
| *G02F 2/00* | (2006.01) |
| *H01S 3/00* | (2006.01) |
| *H04B 10/00* | (2013.01) |
| *H04J 14/00* | (2006.01) |
| *H04J 14/02* | (2006.01) |

(52) U.S. Cl.
CPC .................... *H04J 14/0282* (2013.01)
USPC ..................... 398/7; 398/1; 398/153; 398/168

(58) Field of Classification Search
CPC .. H04B 10/07; H04B 10/079; H04B 10/0793; H04B 10/0795; H04B 10/07953; H04B 10/07955; H04B 10/07957; H04B 10/0799; H04B 17/00; H04B 17/0002; H04B 17/003; H04B 17/0037
See application file for complete search history.

(56) References Cited

U.S. PATENT DOCUMENTS

| | | | | |
|---|---|---|---|---|
| 6,407,843 | B1 * | 6/2002 | Rowan et al. ................. | 398/202 |
| 6,577,414 | B1 | 6/2003 | Feldman et al. | |
| 6,637,033 | B1 * | 10/2003 | Cloonan et al. ............... | 725/117 |
| 2002/0080444 | A1 | 6/2002 | Phillips et al. | |
| 2002/0186803 | A1 * | 12/2002 | Kolze ............................ | 375/358 |
| 2003/0110509 | A1 | 6/2003 | Levinson et al. | |
| 2005/0012106 | A1 | 1/2005 | Fathimulla et al. | |
| 2005/0025485 | A1 | 2/2005 | Lee et al. | |
| 2005/0025504 | A1 * | 2/2005 | Huang et al. .................. | 398/202 |
| 2005/0047442 | A1 | 3/2005 | Volpe et al. | |
| 2005/0078958 | A1 * | 4/2005 | Chae et al. ...................... | 398/41 |
| 2005/0172328 | A1 * | 8/2005 | Park et al. ...................... | 725/129 |
| 2006/0098697 | A1 | 5/2006 | Kim et al. | |
| 2006/0115271 | A1 | 6/2006 | Hwang et al. | |
| 2007/0058989 | A1 | 3/2007 | Kaku et al. | |
| 2007/0183738 | A1 | 8/2007 | Welch et al. | |
| 2008/0085118 | A1 * | 4/2008 | Effenberger ..................... | 398/82 |
| 2008/0101801 | A1 | 5/2008 | Khalouf et al. | |
| 2008/0232801 | A1 * | 9/2008 | Arnold et al. .................. | 398/58 |
| 2009/0041459 | A1 | 2/2009 | Dress et al. | |
| 2009/0317091 | A1 | 12/2009 | Vogel | |

OTHER PUBLICATIONS

International search report and the written opinion of the international searching authority, PCT/US2010/000962, mailed May 19, 2010.

* cited by examiner

*Primary Examiner* — Darren E Wolf
(74) *Attorney, Agent, or Firm* — John Bruckner PC

(57) ABSTRACT

A method includes detecting wavelength collision including identifying a pair or pairs of ONTs that transmit the colliding wavelengths and recovering from collision wherein wavelengths of the pair or pairs of ONTs that cause collisions are re-adjusted to eliminate the collision.

5 Claims, 2 Drawing Sheets

SELF-CORRECTING WAVELENGTH COLLISION AVOIDANCE SYSTEM

CROSS-REFERENCE(S) TO RELATED APPLICATION(S)

This application claims a benefit of priority under 35 U.S.C. 119(e) from copending provisional patent application U.S. Ser. No. 61/208,027, filed Feb. 18, 2009, the entire contents of which are hereby expressly incorporated herein by reference for all purposes.

BACKGROUND INFORMATION

1. Field of the Invention

Embodiments of the invention relate generally to the field of self-correcting wavelength collision avoidance. More particularly, an embodiment of the invention relates to a process of detecting wavelength collision, identifying a pair or pairs of optical network terminals (ONTs) that transmit the colliding wavelengths and collision recover where the wavelengths of the ONTs that cause collisions are re-adjusted to eliminate the collision.

2. Discussion of the Related Art

Telephone companies such as Verizon and AT&T have started to offer services over passive optical networks (PONs) using fiber-to-the-premise (FTTP) and fiber-to-the-curb (FTTC) systems such as FiOS™ and U-verse™. These systems offer dramatically higher data bandwidths by bringing optical fiber to the home or close to home. In order to maintain their upper hand in bandwidth per customer, North American cable operators have started deploying their own PON networks. These networks utilize scalable fiber-to-the-home (FTTH) systems, building upon fiber deployed to date in new builds and upgrades that can offer bandwidths similar to, or higher than, that provided by FiOS™ and U-verse™.

MSOs want to continue utilizing DOCSIS platform for wideband services such as high speed data (HSD), Voice over IP (VoIP) and other services supported by this platform, which provides for downstream data bandwidth up to 640 Mb/s or more, until such a time as yet higher data speeds are required. At such a time, the MSOs want the flexibility to upgrade their FTTH ONT device to handle Gb/s data speeds offered by passive optical networks (PONs) such as GPON or GEPON. They also want to support deployed interactive TV services that are based on set top boxes with active upstream signaling to support fully interactive services such as Video on Demand (VoD) and Switched Digital Video (SDV).

RF over Glass (RFoG) is the name given to the generic FTTH PON architecture that supports both legacy DOCSIS cable upstream signals and additional high speed (>1 Gb/s) PON service(s). FIG. 1 shows the schematic diagram of the RFoG PON architecture.

In the RFoG PON architecture, traditional cable services (analog and digital video, VOD, VoIP, HSD, etc.) are transported downstream on wavelength $\lambda_{d1}$ (typically 1550 nm), while DOCSIS cable upstream signals are on wavelength $\lambda_{u1}$ (typically 1590 nm or 1610 nm). None of these wavelengths denote a single wavelength. Rather, they denote a range of wavelengths with the nominal wavelength as listed. For example, 1310 nm wavelength commonly used for upstream signals in GEPN and GPON can encompass wavelength from 1300 nm to 1320 nm. Additional wavelengths $\lambda_{d2}$, $\lambda_{u2}$, (and possibly more wavelength pairs) are multiplexed on the same fiber using the wavelength combiner to support high-speed (Gb/s or higher) PON service(s) such as GEPON, GPON and 10 Gb/s EPON and GPON.

The downstream signal on wavelength $\lambda_{d1}$ is optically amplified in the headend/hub and broadcast to all the RFoG optical network terminals (ONTs). The upstream data on wavelength $\lambda_{u1}$ originates from cable modems attached to the ONTs on a QAM signal at some fixed RF frequency between 0-45 MHz (in North America, other sets of frequencies can be used and are used in Europe, Japan and other countries and regions). This upstream QAM signal is extracted by the band-pass filter (BPF) (optional) and fed to the cable modem termination system (CMTS) input in the headend/hub.

Although the upstream signals from all ONTs operate in the same wavelength range with the nominal wavelength ($\lambda_{u1}$) and at the same RF frequency, and are combined together by the PON splitter/combiner, wavelength collisions are avoided at the upstream optical receiver since GEPON, PON and DOCSIS systems employ time-division multiple access (TDMA). That is, the OLT or CMTS permits only one ONT or cable modem to transmit data at any given time.

The ONTs employ burst-mode transmission in the reverse path to ensure that the reverse path laser in the ONT only turns on when it is allowed to transmit (by OLT) or detects incoming data from the cable modem (that is allowed to transmit by CMTS) and is off the rest of the time. In this manner, upstream wavelength collisions are avoided. Avoiding wavelength collisions is of critical importance in a PON system—if two optical signals with the same wavelength are incident on a receiver, optical beating causes a severe degradation of the signal-to-noise ratio (SNR) over the entire return path bandwidth rendering the receiver unable to detect any signals for the duration of the wavelength collision.

A disadvantage of the conventional RFoG architecture shown in FIG. 1 is the disproportionate cost of transporting the traditional cable return signals—mainly signaling from a set-top-box (STB) and QAM channels for DOCSIS data signals. A major concern is that only one DOCSIS channel is supported in the return band (a QAM channel at a RF frequency between 0-45 MHz in North America).

SUMMARY OF THE INVENTION

There is a need for the following embodiments of the invention. Of course, the invention is not limited to these embodiments.

According to an embodiment of the invention, a method comprises: detecting wavelength collision including identifying a pair or pairs of ONTs that transmit the colliding wavelengths and recovering from collision wherein wavelengths of the pair or pairs of ONTs that cause collisions are re-adjusted to eliminate the collision. According to another embodiment of the invention, an apparatus comprises: a headend FTTH hub coupled to a plurality of optical network terminals via a PON splitter/combiner, wherein the headend FTTH hub includes a cable forward signal source coupled to an optical transmitter, an optical amplifier coupled to the optical transmitter and PON services merged with the output of the optical amplifier using wavelength combiner/splitter.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
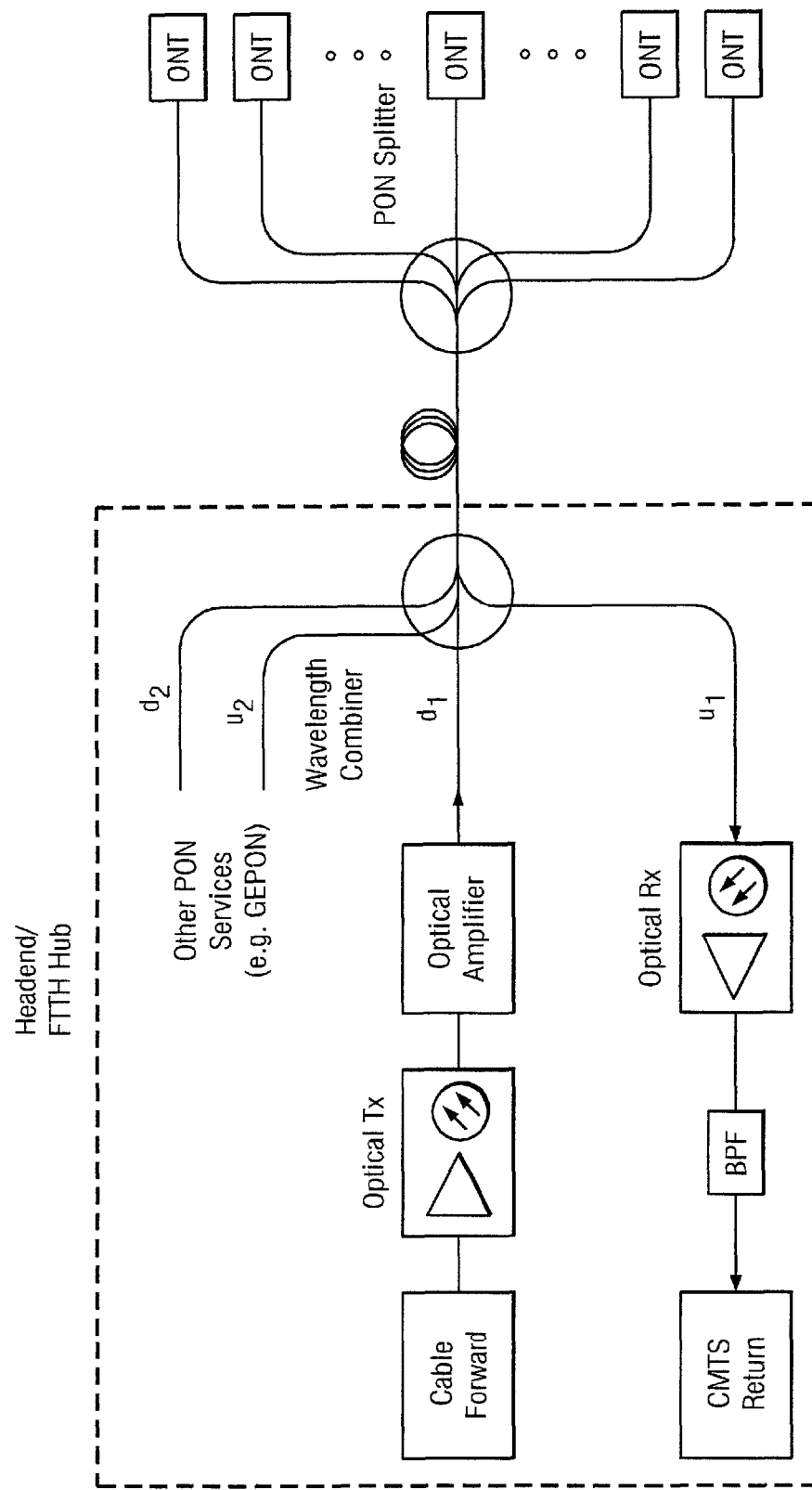
FIG. 1 illustrates an RFoG PON architecture where traditional cable services are transported downstream on wavelength $\lambda_{d1}$, DOCSIS cable upstream signals on wavelength $\lambda_{u1}$, and wavelengths $\lambda_{d2}$, $\lambda_{u2}$, (and possibly more wavelength pairs) are used for Gb/s or higher PON service(s) appropriately labeled "PRIOR ART".
Figure 2:
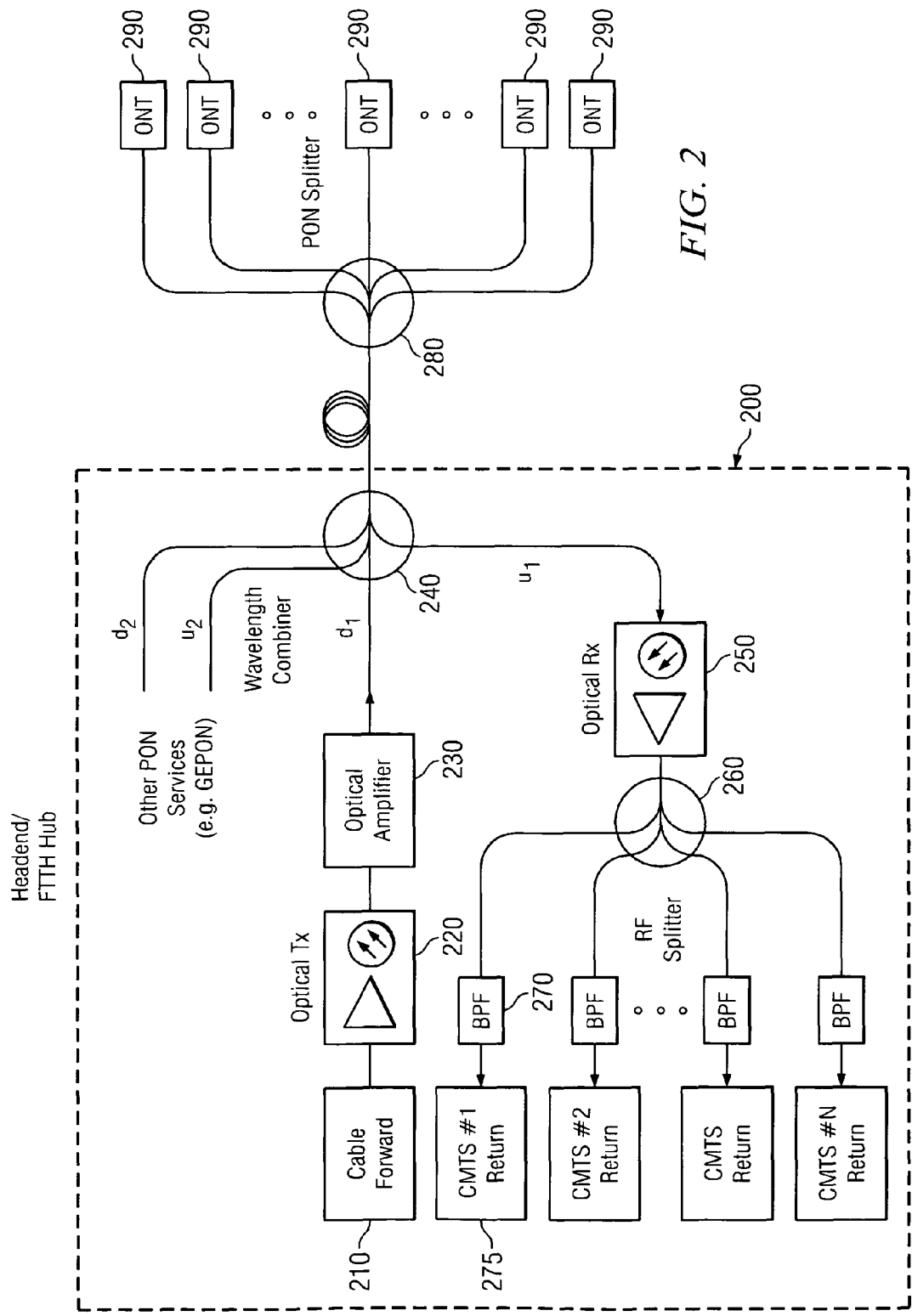
FIG. 2 illustrates an enhanced RFoG PON architecture where multiple DOCSIS cable modem termination systems (CMTSs) utilize the same upstream wavelength range with nominal wavelength $\lambda_{u1}$.

An attractive alternative to the conventional RFoG architecture of FIG. 1 is an enhanced version that supports multiple frequency-division-multiplexed (FDM) DOCSIS return channels, as shown in FIG. 2. A headend FTTH hub 200 is coupled to a plurality of optical network terminals 290 via a PON splitter/combiner 280. A cable forward signal source 210 is coupled to an optical transmitter 220. An optical amplifier 230 is coupled to the optical transmitter 220. Other PON services, such as GEPON) are merged with the output of the optical amplifier 230 using a wavelength combiner/splitter 240. The PON splitter/combiner 280 is coupled to the wavelength combiner/splitter 240. An optical receiver 250 is also coupled to the wavelength combiner/splitter 240. An RF splitter 260 is coupled to the optical receiver 250. A plurality of band pass filters 270 (BPFs) and coupled to the RF splitter 260 that is in-turn coupled to a plurality of cable modem termination system returns 275 in the headend FTTH hub 200.

This enhanced system utilizes more of the cable return bandwidth to support N DOCSIS channels (with N≥1). The upstream signals of the ONTs (all within the wavelength range with nominal wavelength $\lambda_{u1}$) may include of N QAM channels, each at a different RF frequency within the return band of 0-45 MHz. The output of the return path optical receiver in the headend/hub is split to N band-pass filters (external or internal to CMTS, working at RF or IF, analog or digital), each of which extracts one of the QAM channels and feeds it to the corresponding CMTS at the FTTH node, hub or head-end. In this way, the N TDMA channels are separated from each other in the return path.

Although the N DOCSIS channels are separated in time and frequency, they share the same group of return lasers in the ONTs that communicate to a single shared receiver. When there is just one DOCSIS channel present (N=1), there is no chance that two lasers are on simultaneously since the TDMA protocol ensures that only one cable modem is transmitting at any time which means that only one laser is on at any given time due to the use of burst-mode transmission in the ONTs.

When there are N DOCSIS channel present (N>1) the possibility arises that as many as N lasers are on simultaneously, each one transmitting data on one of the N DOCSIS channels. The major concern about the viability of the enhanced RFoG architecture of FIG. 2 is that addressing the detection and prevention of wavelength collisions.

An object of the present invention is to provide a method and system architecture for the detection and prevention of wavelength collisions in networks where multiple TDMA systems operate over a common laser transmitter. Such a self-correcting wavelength collision avoidance system is comprised of four key features: (1) detection of wavelength collisions, (2) a method to identify the ONT devices that are giving rise to the collisions, (3) a mechanism to quickly recover from wavelength collisions, and (4) a pre-emptive method of avoiding collisions in the first place when the network is first installed.

Collision Detection

The detection of the collision potential or collision that is already occurring is the first step in the Self-Correcting Wavelength Collision Avoidance System.

Collision detection would be performed in the optical domain before the receiver or in electrical domain following the optical receiver in the headend/node using the following algorithms (these are just examples, the collision detection can involve any available technique and technology and can be preventive as for example optical wavelength measurement is or reactive as SNR and BER/MER measurements are):

Wavelength Monitoring: Detecting wavelengths with any wavelength measurement techniques.

SNR Monitoring: Real-time monitoring of the SNR would look for the unique noise signature of wavelength collisions. Unlike impulse noise, CW interference or other types of return path degradations, the spectrum of optical beating noise is extremely wide and can change over nanosecond time frames as the lasers involved in the optical beating are turned on and off.

MER/BER Monitoring: Burst-mode receiver chips would monitor the bit-error-rate (BER) and modulation error ratio (MER) of the upstream QAM signals.

A behavior of electrical signal generated internally by ONT during the time the ONT laser is on. This signal would indicate collision by easily identifiable behavior when colliding with a similar signal generated by another ONT. These signals can include an identifier to allow for easy identification of the ONTs that generate them.

If SNR/MER/BER degradation is observed at times when no laser, or only one laser, is operating then such events would not be classified as collisions. Only degradation events that are correlated with two or more lasers on at the same time would be flagged as likely collisions to be followed by identification of the ONTs involved.

Collision Identification

The identification of ONT lasers that transmit colliding wavelengths is an integral part of the Self-Correcting Wavelength Collision Avoidance System.

Statistical analysis of the DOCSIS traffic can reveal if SNR/MER/BER degradation is observed only when certain ONT lasers are turned on. In this manner, the likely ONTs involved in the collision can be easily identified. The system (in cooperation with CMTSs) would correlate the time of occurrence of OBI with the ONTs (and associated cable modems) on at that time to allow for accurate identification of colliding ONT pair.

Another method can be forced switching on a combination of pairs and analyzing SNR/BER/MER behavior of each pair thus discovering the colliding pair.

In a preventive method (wavelength measurement), the wavelength pair that would be indicating possible collision would be identified in cooperation with CMTSs.

In the method where ONTs generate internal signals (these signals can be used to detect collision or can be generated purely for identification purpose), the identifier attached to the signal would identify the ONT pair that generates colliding wavelengths.

Collision Recovery

If two ONTs are identified as being involved in wavelength collisions, it indicates that their laser wavelengths are closer together than several times the laser chirp of these transmitters, typically on the order of a few to tens of GHz.

A simple way of preventing laser collisions would be to lock the wavelengths of all ONTs to different wavelengths. With potentially hundreds of ONTs present in an RFoG network, this would require locking to a 25 GHz grid (or finer) using wavelength lockers. Such technology is prohibitively expensive to be used in ONT devices located at the subscriber premises but it can be implemented when it becomes more cost-effective.

A simpler solution is proposed in which lasers are tuned (but not necessarily precisely locked) to different wavelengths if they are determined to be involved in wavelength collisions. The laser tuning is performed remotely using simple techniques such as temperature changes, electrostatic forces, piezoelectric element or optoelectronics methods.

The object is to place the wavelength of each ONT device in different "wavelength bins" whose widths are greater than several times the laser chirp so that lasers in different wavelength bins do not optically beat with each other. With typical wavelength bins that are a few GHz wide, the required tuning range is several hundreds of GHz which can be achieved using even simple temperature tuning of the lasers.

If two ONTs are identified as being involved in collisions, then the wavelength of one of these ONTs would be remotely tuned to a different wavelength bin. If N ONTs are identified as being involved in collisions then the wavelengths of N−1 of these ONTs would be shifted to other bins. The wavelength of each of these N−1 ONTs would be shifted by a random number of bins to decrease the probability that they will end up in the same bin again. The wavelength re-tuning is performed in a manner that results in ONT wavelengths that are close to being uniformly distributed among all the possible bins.

Collision Avoidance

When the network is first installed, or at scheduled maintenance periods, an initialization program can be run to distribute the ONT wavelengths as randomly as possible into separate bins so that wavelength collisions are avoided for as long as possible. This initialization process would start by assigning random wavelength bins to the M ONT lasers in the network. If wavelength tuning is performed by temperature control, for example, this would mean that the M ONT lasers are randomly assigned a temperature (not necessarily distinct since two lasers at the same temperature could have different wavelengths depending on the initial wavelength distribution of the lasers at room temperature). This is analogous to throwing M marbles randomly onto a board that has a large number of bins (K) that they can fall into. The total number of ways that M marbles can fall into K bins is $K^M$. The number of ways they can fall so that each falls in a separate bin is $P^K_M$, the permutation of K things taken M at a time. Thus the probability of wavelength collisions occurring is given by:

$$Prob[\text{Collisions}] = 1 - Prob[\text{No Collisions}]$$
$$= 1 - Prob[\text{each } ONT \text{ wavelength in a separate bin}]$$
$$= 1 - P^K_M / K^M$$

$$\text{That is, } Prob[\text{Collisions}] = 1 - \frac{K!}{K^M(K-M)!}$$

Since K>>M, this probability is already small to begin with. Nevertheless, there is a small probability that some wavelengths are in the same bin and that collisions will happen.

In the next step of the initialization procedure, each possible pair of ONTs is turned on remotely, one by one. There are $C^M_2$ (the combination of M things taken 2 at a time), or M(M−1)/2 such pairs to be tried. If a collision is detected, the wavelength of one of the two ONTs involved is re-assigned as described before. This is analogous to taking a marble out of a bin that has more than one marble in it and throwing it again at random.

After this step, there is a smaller probability that multiple ONT wavelengths occupy the same wavelength bin. The process of checking all possible pairs for collisions is then repeated. For K>>M, only two or three such iterations are required before the probability becomes vanishingly small that any two ONTs wavelengths are close enough to cause collisions.

The invention can include a process of detecting the wavelength collision, identifying a pair or pairs of ONTs that transmit the colliding wavelengths and collision recover where the wavelengths of the ONTs that cause collisions are re-adjusted to eliminate the collision.

The invention can include a process of collision avoidance implemented during initial installation or during the maintenance periods. This process involves turning on each pair of lasers communicating to the same receiver, checking for collision and if collision is detected, readjusting the wavelengths to eliminate the collision. This process is repeated until collision-free system is achieved and, then, stabilized by locking the wavelengths in any manner technologically feasible (some examples were presented above).

The invention can include a method and system architecture for the detection and prevention of wavelength collisions in networks where multiple TDMA systems operate over a common laser transmitter.

The invention can include a real-time detection of wavelength collisions using (but not limited to) any of the methods described above.

The invention can include burst-mode receiver chips that monitor BER and MER of upstream QAM signals.

The invention can include real-time identification of ONTs involved in wavelength collisions using (but not limited to) any of the methods described above (one of them being correlating degradation events with DOCSIS traffic analysis, the other by detecting identifiers of the signals generated internally by ONTs).

The invention can include real-time re-tuning of ONT lasers identified as involved in wavelength collisions into different "wavelength bins" using temperature changes, electrostatic forces, piezoelectric element or optoelectronics methods (or any method made possible by technology).

The invention can include an initialization algorithm to distribute the ONT wavelengths as randomly as possible into separate "wavelength bins" so that wavelength collisions are avoided for as long as possible.

Definitions

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this invention belongs. In case of conflict, the present specification, including definitions, will control.

Conclusion

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be combined in the disclosed configurations, but could be combined in any and all configurations.

Various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising
    detecting a wavelength collision in a network where multiple TDMA systems operate over a common laser transmitter;
    identifying a pair of optical network terminals whose laser wavelengths are closer together than several times a laser chirp of transmitters that transmit colliding wavelengths from the pair of optical network terminals; and
    recovering from the wavelength collision including re-adjusting wavelengths of the pair of optical network terminals that cause collisions to eliminate the wavelength collision by placing a wavelength of a laser of each optical network terminal device in different wavelength bins whose widths are greater than several times the laser chirp so that lasers in different wavelength bins do not optically beat with each other, wherein re-adjusting includes tuning remotely a wavelength of one of the pair of optical network terminals to a different wavelength bin.

2. An apparatus, comprising: a headend FTTH hub coupled to a plurality of optical network terminals via a PON splitter/combiner, wherein the headend FTTH hub includes a cable forward signal source coupled to an optical transmitter, an optical amplifier coupled to the optical transmitter and PON services merged with the output of the optical amplifier using a wavelength combiner/splitter, wherein multiple frequency-division-multiplexed DOCSIS cable modem termination systems return channels utilize the same upstream wavelength range with nominal wavelength $\lambda_{u1}$ including detecting a wavelength collision; identifying a pair of optical network terminals whose laser wavelengths are closer together than several times a laser chirp of these transmitters that transmit colliding wavelengths; and recovering from the wavelength collision including re-adjusting wavelengths of the pair of optical network terminals to eliminate the wavelength collision by placing wavelength of each of the pair of optical network terminals in different wavelength bins whose widths are greater than several times the laser chirp so that lasers in different wavelength bins do not optically beat with each other, wherein re-adjusting includes tuning remotely a wavelength of one of the pair of optical network terminals to a different wavelength bin.

3. The apparatus of claim 2, wherein the PON splitter/combiner is coupled to the wavelength combiner/splitter.

4. The apparatus of claim 2, further comprising an optical receiver coupled to the wavelength combiner/splitter, an RF splitter coupled to the optical receiver, a plurality of band pass filters coupled to the RF splitter and a plurality of cable modem termination system returns coupled to the RF splitter.

5. A network where multiple TDMA systems operate over a common laser transmitter, comprising the apparatus of claim 2.

* * * * *